United States Patent
Ando

(10) Patent No.: US 10,637,258 B2
(45) Date of Patent: Apr. 28, 2020

(54) VEHICLE AND METHOD OF CONTROLLING CHARGING OF VEHICLE

(71) Applicant: Toyota Jidosha Kabushiki Kaisha, Toyota-shi, Aichi-ken (JP)

(72) Inventor: Toru Ando, Obu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 176 days.

(21) Appl. No.: 15/886,226

(22) Filed: Feb. 1, 2018

(65) Prior Publication Data

US 2018/0226813 A1   Aug. 9, 2018

(30) Foreign Application Priority Data

Feb. 6, 2017   (JP) .................................. 2017-019673

(51) Int. Cl.
| | |
|---|---|
| H01M 10/44 | (2006.01) |
| H01M 10/46 | (2006.01) |
| H02J 7/00 | (2006.01) |
| B60L 53/18 | (2019.01) |
| B60L 53/12 | (2019.01) |
| B60L 53/16 | (2019.01) |

(52) U.S. Cl.
CPC ............ H02J 7/0021 (2013.01); B60L 53/12 (2019.02); B60L 53/16 (2019.02); B60L 53/18 (2019.02); *Y02T 10/7005* (2013.01)

(58) Field of Classification Search
CPC .......... H02J 7/0042; H02J 7/355; H02J 7/025; H02J 5/005; H02J 7/04

USPC ................. 320/104, 107, 108, 109
See application file for complete search history.

(56) References Cited

U.S. PATENT DOCUMENTS

| | | | |
|---|---|---|---|
| 9,180,783 B1* | 11/2015 | Penilla | G01C 21/3469 |
| 2013/0127409 A1 | 5/2013 | Ichikawa | |
| 2013/0193749 A1 | 8/2013 | Nakamura et al. | |
| 2015/0008877 A1 | 1/2015 | Ichikawa et al. | |
| 2016/0288653 A1* | 10/2016 | Tsukamoto | H02J 5/005 |

FOREIGN PATENT DOCUMENTS

| | | |
|---|---|---|
| EP | 2740624 A1 | 6/2014 |
| JP | 2011-015548 A | 1/2011 |
| JP | 2013110822 A | 6/2013 |

(Continued)

*Primary Examiner* — Edward Tso
(74) *Attorney, Agent, or Firm* — Dinsmore & Shohl LLP

(57) ABSTRACT

A vehicle includes an electric power reception device configured to contactlessly receive electric power from an electric power transmission device outside the vehicle, a charging inlet configured such that a charging connector of a charging cable that supplies electric power to the vehicle is connected to the charging inlet, a restriction mechanism configured to restrict connection of the charging connector to the charging inlet, and a controller configured to execute a process of stopping electric power reception performed by the electric power reception device when the charging connector is connected to the charging inlet during the electric power reception performed by the electric power reception device. The controller controls the restriction mechanism to restrict connection of the charging connector to the charging inlet during the electric power reception performed by the electric power reception device.

7 Claims, 7 Drawing Sheets

(56) References Cited

FOREIGN PATENT DOCUMENTS

| JP | 2013126327 A | 6/2013 |
|----|--------------|--------|
| JP | 2013146148 A | 7/2013 |
| JP | 2013146154 A | 7/2013 |
| JP | 2013154815 A | 8/2013 |
| JP | 2013179723 A | 9/2013 |
| JP | 2014-112997 A | 6/2014 |
| JP | 2016063695 A | 4/2016 |
| WO | 2013137029 A1 | 9/2013 |

* cited by examiner

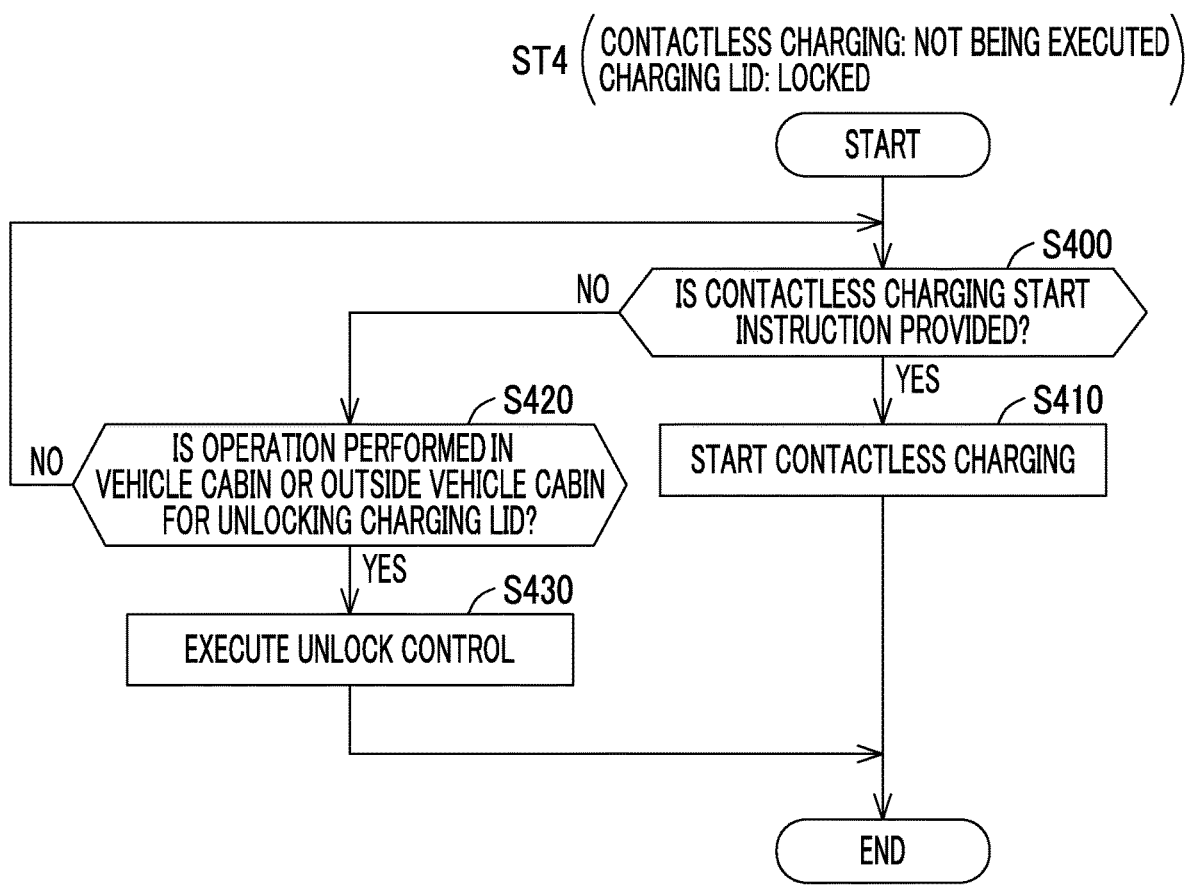

VEHICLE AND METHOD OF CONTROLLING CHARGING OF VEHICLE

CROSS-REFERENCE TO RELATED APPLICATIONS

This application claims priority to Japanese Patent Application No. 2017-019673 filed on Feb. 6, 2017, which is incorporated herein by reference in its entirety including the specification, drawings and abstract.

BACKGROUND

1. Technical Field

The present disclosure relates to a vehicle and a method of controlling charging of a vehicle and particularly, relates to a vehicle including an electric power reception device configured to contactlessly receive electric power from an electric power transmission device outside the vehicle, and a method of controlling charging of a vehicle.

2. Description of Related Art

A contactless electric power transfer system that contactlessly transmits electric power to an electric power reception device from an electric power transmission device is known (refer to Japanese Unexamined Patent Application Publication No. 2013-179723 (JP 2013-179723 A), Japanese Unexamined Patent Application Publication No. 2013-154815 (JP 2013-154815 A), Japanese Unexamined Patent Application Publication No. 2013-146154 (JP 2013-146154 A), Japanese Unexamined Patent Application Publication No. 2013-146148 (JP 2013-146148 A), Japanese Unexamined Patent Application Publication No. 2013-110822 (JP 2013-110822 A), and Japanese Unexamined Patent Application Publication No. 2013-126327 (JP 2013-126327 A)). The electric power transmission device includes an electric power transmission coil, and the electric power reception device includes an electric power reception coil.

For example, a vehicle disclosed in JP 2013-179723 A enables a vehicle-mounted electric power storage device to be charged by using electric power that is contactlessly received from the electric power transmission device outside the vehicle (hereinafter, referred to as "contactless charging"). The vehicle also enables the vehicle-mounted electric power storage device to be charged by using electric power that is supplied from a charging station outside the vehicle through a charging cable (hereinafter, referred to as "contacted charging"). When the charging cable is connected to the vehicle during contactless charging, contactless charging is stopped, and contacted charging is started.

SUMMARY

In contactless charging, a user outside the vehicle may not recognize whether or not charging is being performed, since contactless charging does not use the charging cable unlike contacted charging. Accordingly, there is a possibility of connecting the charging cable to the vehicle even during contactless charging. In such a case, in the vehicle disclosed in JP 2013-179723 A, contactless charging is stopped, and contacted charging is started. Consequently, for example, when the amount of electric power transmitted in contactless charging is larger than the amount of electric power supplied in contacted charging, the period of time needed for charging the vehicle-mounted electric power storage device may be lengthened.

The present disclosure provides a vehicle that can appropriately suppress forced switching to contacted charging from contactless charging due to accidental connection of a charging cable to the vehicle during contactless charging, and a method of controlling charging of a vehicle.

A first aspect of the present disclosure relates to a vehicle including an electric power reception device configured to contactlessly receive electric power from an electric power transmission device outside the vehicle, a charging inlet configured such that a charging connector of a charging cable that supplies electric power to the vehicle is connected to the charging inlet, a restriction mechanism configured to restrict connection of the charging connector to the charging inlet, and a controller configured to execute a process of stopping electric power reception performed by the electric power reception device when the charging connector is connected to the charging inlet during the electric power reception performed by the electric power reception device. The controller controls the restriction mechanism to restrict connection of the charging connector to the charging inlet during the electric power reception performed by the electric power reception device.

According to the first aspect of the present disclosure, the restriction mechanism restricts connection of the charging connector to the charging inlet during the electric power reception performed by the electric power reception device. Thus, accidental connection of the charging connector to the charging inlet during contactless charging can be appropriately suppressed. Consequently, according to the first aspect of the present disclosure, forced switching to contacted charging from contactless charging can be appropriately suppressed.

In the vehicle according to the first aspect of the present disclosure, the controller may be configured to control the restriction mechanism to release the restriction of connection of the charging connector to the charging inlet even during the electric power reception performed by the electric power reception device, when a predetermined condition is satisfied.

According to the first aspect of the present disclosure, when the predetermined condition is satisfied, the restriction of connection of the charging connector to the charging inlet performed by the restriction mechanism is released even during the electric power reception performed by the electric power reception device. Accordingly, even during contactless charging, a user can connect the charging connector to the charging inlet when needed.

In the vehicle according to the first aspect of the present disclosure, the predetermined condition may be satisfied by operating a first operating unit disposed in cabin when the electric power reception device is receiving electric power, and may be satisfied by operating the first operating unit or operating a second operating unit outside the vehicle cabin when the electric power reception device is not receiving electric power.

According to the first aspect of the present disclosure, during contactless charging, the restriction performed by the restriction mechanism is not released by an operation that is performed by the user outside the vehicle cabin. Thus, the possibility of accidental connection of the charging connector to the charging inlet during contactless charging can be reduced.

In the vehicle according to the first aspect of the present disclosure, the restriction mechanism may be configured with a charging lid that is opened or closed with respect to the charging inlet, and a lid lock mechanism configured to keep the charging lid in a closed state.

In the vehicle according to the first aspect of the present disclosure, the first operating unit may be a lock operating unit that is disposed in the vehicle cabin and changes a lock state of the charging lid and the predetermined condition may be that the lock operating unit is operated to release the charging lid.

The vehicle according to the first aspect of the present disclosure may further include a communication device configured to communicate with the outside of the vehicle. The predetermined condition may be that the second operating unit is operated to release the charging lid. The communication device may receive, from the second operating unit, a signal that changes a lock state of the charging lid. The controller may be configured to receive the signal through the communication device.

A second aspect of the present disclosure relates to a method of controlling charging of a vehicle including an electric power reception device configured to contactlessly receive electric power from an electric power transmission device outside the vehicle, a charging inlet configured such that a charging connector of a charging cable that supplies electric power to the vehicle is connected to the charging inlet, a restriction mechanism configured to restrict connection of the charging connector to the charging inlet, and a controller configured to execute a process of executing and stopping contactless electric power reception performed by the electric power reception device. The method includes performing contacted charging from the charging connector when the charging connector is connected to the vehicle, performing contactless charging by the electric power reception device and restricting connection of the charging connector to the charging inlet when an instruction to start the contactless charging is provided with the charging connector not connected, and stopping the contactless electric power reception performed by the electric power reception device when the charging connector is connected to the charging inlet during electric power reception performed by the electric power reception device.

According to the aspects of the present disclosure, a vehicle that can appropriately suppress forced switching to contacted charging from contactless charging due to accidental connection of a charging cable to the vehicle during contactless charging, and a method of controlling charging of a vehicle are provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a flowchart illustrating a process procedure of changing the lock state of the charging lid in a state ST4.

DETAILED DESCRIPTION OF EMBODIMENTS

Figure 1:
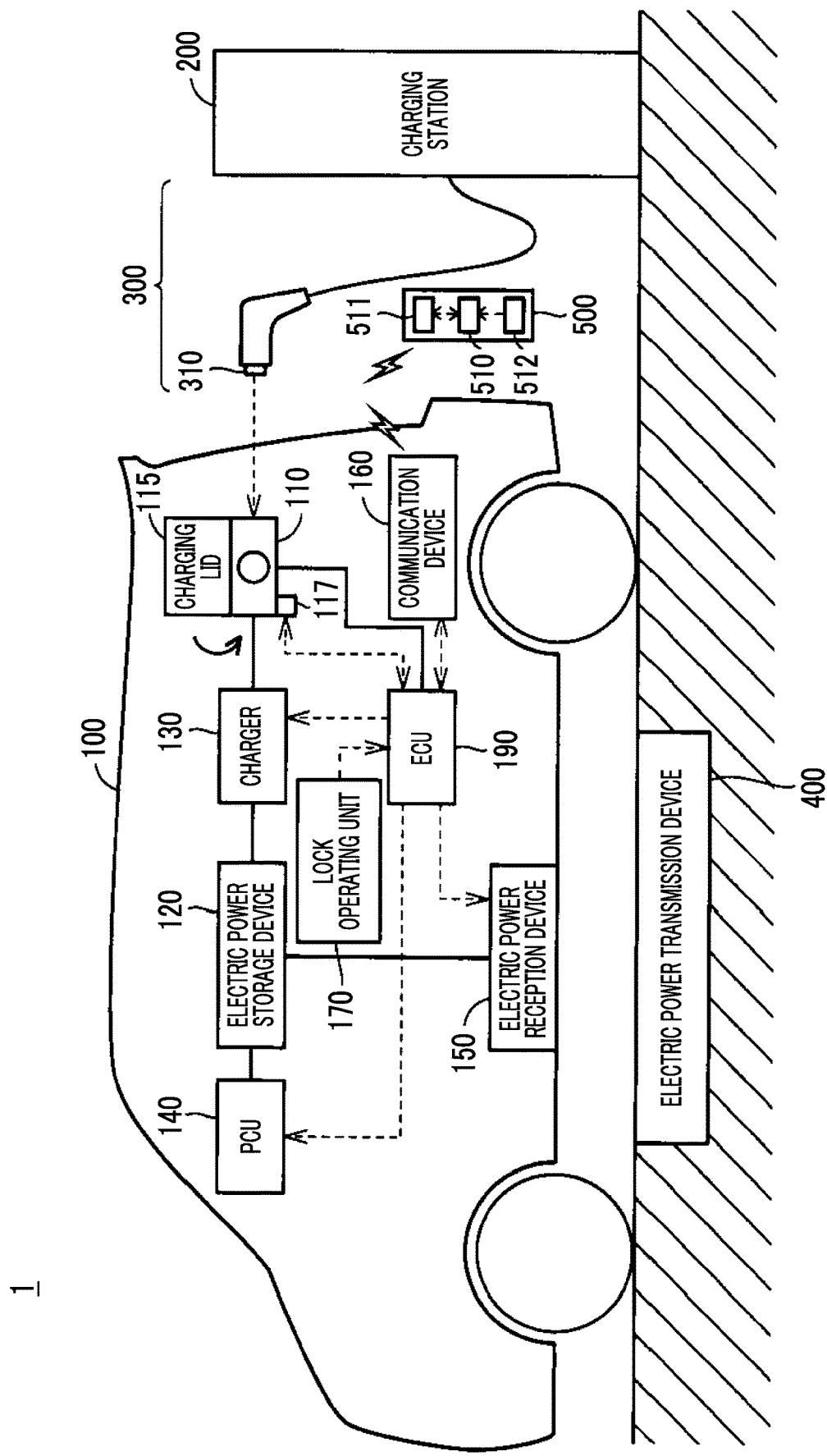
FIG. 1 is a diagram illustrating a configuration of a vehicle charging system.

Hereinafter, an embodiment will be described in detail with reference to the drawings. The same or corresponding parts in the drawings will be designated with the same reference signs and will be described once.

Configuration of Vehicle Charging System

FIG. 1 is a diagram illustrating a configuration of a vehicle charging system 1 to which a vehicle 100 according to the present embodiment is applied. With reference to FIG. 1, the vehicle charging system 1 includes the vehicle 100, a charging station 200, an electric power transmission device 400, and a smart key 500.

Contacted charging that uses electric power supplied from the charging station 200, and contactless charging that uses electric power supplied from the electric power transmission device 400 are performed in the vehicle 100.

The charging station 200 is configured to supply electric power supplied from a system electric power supply (not illustrated) to the vehicle 100. A charging cable 300 is connected to the charging station 200. A charging connector 310 is disposed at the tip end of the charging cable 300. A user can perform contacted charging by connecting the charging connector 310 to a charging inlet 110 (described below) of the vehicle 100.

The electric power transmission device 400 is configured to contactlessly transmit electric power supplied from the system electric power supply to the vehicle 100. The electric power transmission device 400 includes an electric power transmission coil (not illustrated). The electric power transmission coil forms a magnetic field by receiving alternating current electric power supplied from the system electric power supply, and contactlessly transmits electric power to an electric power reception coil (not illustrated) of an electric power reception device 150 (described below) through the formed magnetic field. The number of windings of a conductive wire in the electric power transmission coil is appropriately designed to achieve a large Q factor (for example, $Q \geq 100$) and a large coupling coefficient κ.

The vehicle 100 includes the charging inlet 110, a charging lid 115, a lid lock mechanism 117, an electric power storage device 120, a charger 130, a power control unit (PCU) 140, the electric power reception device 150, a communication device 160, a lock operating unit 170, and an electronic control unit (ECU) 190.

The charging connector 310 of the charging cable 300 is connected to the charging inlet 110. The charging lid 115 that can be opened or closed with respect to the charging inlet 110 is disposed in the charging inlet 110. The lid lock mechanism 117 is disposed in the charging inlet 110.

The lid lock mechanism 117 is configured to keep the charging lid 115 in a closed state when the charging lid 115 is closed. When the lid lock mechanism 117 receives an instruction signal for locking the charging lid 115 (hereinafter, referred to as a "lid lock signal") from the ECU 190 while the charging lid 115 is closed, the lid lock mechanism 117 keeps the charging lid 115 in a closed state. When the lid lock mechanism 117 receives an instruction signal for unlocking the charging lid 115 (hereinafter, referred to as a "lid unlock signal") from the ECU 190, the lid lock mechanism 117 releases the charging lid 115 from being kept in a closed state. When the charging lid 115 is kept in a closed state by the lid lock mechanism 117, the user cannot open the charging lid 115, and the charging inlet 110 is not exposed to the outside of the vehicle 100. Thus, connection of the charging connector 310 to the charging inlet 110 is restricted.

The electric power storage device 120 is an electric power storage component that is configured to be capable of being charged or discharged. The electric power storage device 120 is configured to include a secondary battery such as a lithium ion battery, a nickel-hydrogen battery, or a lead-acid battery, or an electric power storage element such as an electric double-layer capacitor.

The charger 130 is supplied with the alternating current from the charging station 200 through the charging inlet 110. The charger 130 converts the alternating current into a direct current. The charger 130 steps up or steps down the voltage to a desired voltage and supplies electric power having the converted voltage to the electric power storage device 120. The charger 130 is configured to include, for example, a rectification circuit that converts the alternating current into a direct current, and a converter that steps up or steps down the voltage. The charger 130 is not limited to such a configuration. For example, the charger 130 may be configured to supply direct current electric power supplied from an electric power supply outside the vehicle to the electric power storage device 120.

The PCU 140 includes an inverter and a motor and the like connected to the inverter. The PCU 140 generates traveling drive power for the vehicle 100 by using electric power supplied from the electric power storage device 120.

The electric power reception device 150 includes the electric power reception coil (not illustrated). The electric power reception device 150 contactlessly receives the alternating current by the electric power reception coil. The electric power reception device 150 converts the alternating current into a direct current. The electric power reception device 150 converts the voltage to a desired voltage. The electric power reception device 150 supplies electric power having the converted voltage to the electric power storage device 120. The number of windings of a conductive wire in the electric power reception coil is appropriately designed to achieve a large Q factor (for example, Q≥100) and a large coupling coefficient κ.

The communication device 160 is configured to communicate with the smart key 500 and the electric power transmission device 400. The communication device 160 is configured to exchange information needed for contactless electric power transfer with the electric power transmission device 400. The communication device 160 is configured to receive, for example, an instruction to change the lock state of the lid lock mechanism 117 from the smart key 500.

The lock operating unit 170 is configured to receive an instruction from the user with respect to changing the lock state of the charging lid 115. The lock operating unit 170 is, for example, a lever that is disposed in a vehicle cabin of the vehicle 100 for changing the lock state of the charging lid 115. When the user operates the lock operating unit 170 to lock the charging lid 115, the ECU 190 controls the lid lock mechanism 117 to lock the charging lid 115. When the user operates the lock operating unit 170 to unlock the charging lid 115, the ECU 190 controls the lid lock mechanism 117 to unlock the charging lid 115.

The ECU 190 incorporates a central processing unit (CPU) and a memory, not illustrated, and controls each device of the vehicle 100 based on information stored in the memory or information from each sensor (not illustrated). For example, the ECU 190 controls the lock state of the charging lid 115 in accordance with whether or not the electric power reception device 150 is receiving electric power from the electric power transmission device 400, and the content of an instruction from the user. A change in the lock state of the charging lid 115 caused by the state of contactless charging and the content of the instruction from the user will be described in more detail below.

The smart key 500 includes a communication unit 511, a lock operating unit 512, and a controller 510. When the smart key 500 enters a communication range of the vehicle 100, communication is enabled between the communication unit 511 and the communication device 160 of the vehicle 100. When the ECU 190 authenticates the smart key 500 as a valid smart key of the user of the vehicle 100, communication is established between the communication unit 511 and the communication device 160. Then, for example, the user can change the lock state of the charging lid 115 by operating the lock operating unit 512 in a state in which a condition described below (a condition that the lock state of the charging lid 115 can be changed through the lock operating unit 512) is satisfied.

For example, when the user performs is an operation for locking the charging lid 115 through the lock operating unit 512 in a state in which the condition described below is satisfied, the controller 510 controls the communication unit 511 to transmit an instruction signal for locking the charging lid 115. When the signal is received through the communication device 160, the ECU 190 transmits the lid lock signal to the lid lock mechanism 117. Accordingly, the charging lid 115 is kept in a closed state. When the user performs an operation for unlocking the charging lid 115 through the lock operating unit 512 in a state in which the condition described below is satisfied, the controller 510 controls the communication unit 511 to transmit an instruction signal for unlocking the charging lid 115. When the signal is received through the communication device 160, the ECU 190 transmits the lid unlock signal to the lid lock mechanism 117. Accordingly, the charging lid 115 is unlocked, and the charging lid 115 can be opened or closed.

Competitive Relationship Between Contacted Charging and Contactless Charging

As described above, the vehicle 100 supports both contacted charging and contactless charging. Accordingly, for example, the charging connector 310 may be connected to the charging inlet 110 during contactless charging. In such a case, in the vehicle 100, contactless charging is stopped, and contacted charging is started. The reason is because the user connects the charging connector 310 to the charging inlet 110, and the user has a high possibility of desiring contacted charging more than contactless charging.

Figure 2:
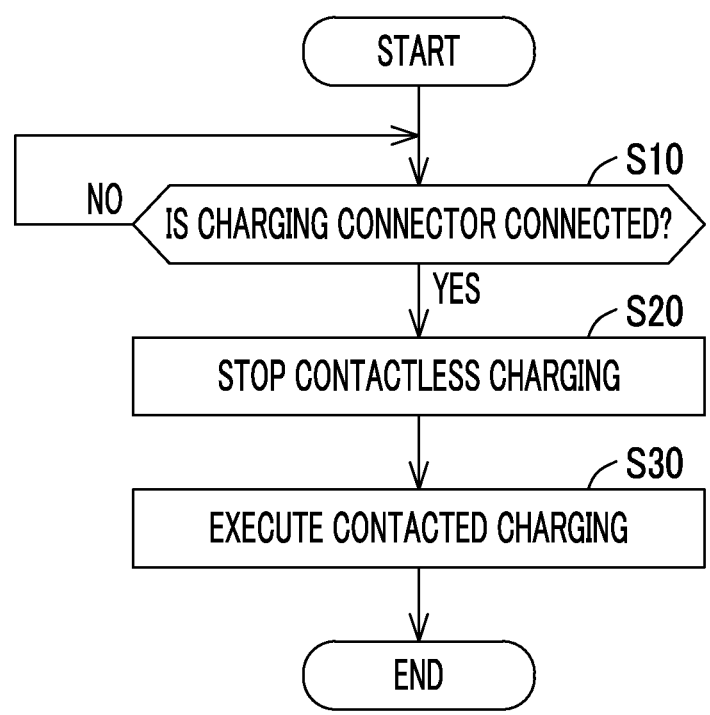
FIG. 2 is a flowchart illustrating a process procedure when a charging connector is connected to a charging inlet during contactless charging.

FIG. 2 is a flowchart illustrating a process procedure when the charging connector 310 is connected to the charging inlet 110 during contactless charging. The process illustrated in the flowchart in FIG. 2 is started along with the start of contactless charging. The process is finished when the process transitions to END, or when contactless charging is finished without connection of the charging connector 310 to the charging inlet 110.

With reference to FIG. 2, the ECU 190 determines whether or not the charging connector 310 is connected to the charging inlet 110 (step S10). For example, the ECU 190 is configured to detect whether or not the charging connector 310 is connected to the charging inlet 110, by detecting an electrical change caused by connection of the charging connector 310 to the charging inlet 110. When the ECU 190 determines that the charging connector 310 is not connected to the charging inlet 110 (NO in step S10), the ECU 190 continues monitoring connection of the charging connector 310 to the charging inlet 110.

When the ECU 190 determines that the charging connector 310 is connected to the charging inlet 110 (YES in step S10), the ECU 190 executes a process for stopping contactless charging (step S20). For example, the ECU 190 controls the communication device 160 to transmit an instruction signal for stopping electric power transmission to the electric power transmission device 400. Accordingly, the electric power reception device 150 stops receiving electric power.

Then, the ECU 190 controls the charger 130 to perform contacted charging (step S30). Then, the process transitions to END. That is, in the vehicle 100 according to the present embodiment, when the charging connector 310 is connected to the charging inlet 110 during contactless charging, contactless charging is stopped, and contacted charging is started.

Suppression of Accidental Connection of Charging Cable

In contactless charging, the user outside the vehicle 100 may not recognize whether or not charging is being performed, since contactless charging does not use the charging cable 300 unlike contacted charging. Accordingly, there is a possibility of connecting the charging connector 310 of the charging cable 300 to the charging inlet 110 even during contactless charging. In such a case, contactless charging is stopped, and contacted charging is started, as described above. However, for example, when the amount of electric power transmitted in contactless charging is larger than the amount of electric power supplied in contacted charging, the period of time needed for charging the electric power storage device 120 may be lengthened.

In the vehicle 100 according to the present embodiment, the ECU 190 controls the lid lock mechanism 117 to restrict connection of the charging connector 310 to the charging inlet 110 while the electric power reception device 150 is receiving electric power. That is, when contactless charging is started, the ECU 190 controls the lid lock mechanism 117 to lock the charging lid 115. The vehicle 100 restricts connection of the charging connector 310 to the charging inlet 110 during contactless charging (unless the user intentionally unlocks the charging lid 115). Accordingly, accidental connection of the charging connector 310 to the charging inlet 110 during contactless charging can be appropriately suppressed. Consequently, the vehicle 100 can appropriately suppress forced switching, not intended by the user, to contacted charging from contactless charging.

Figure 3:
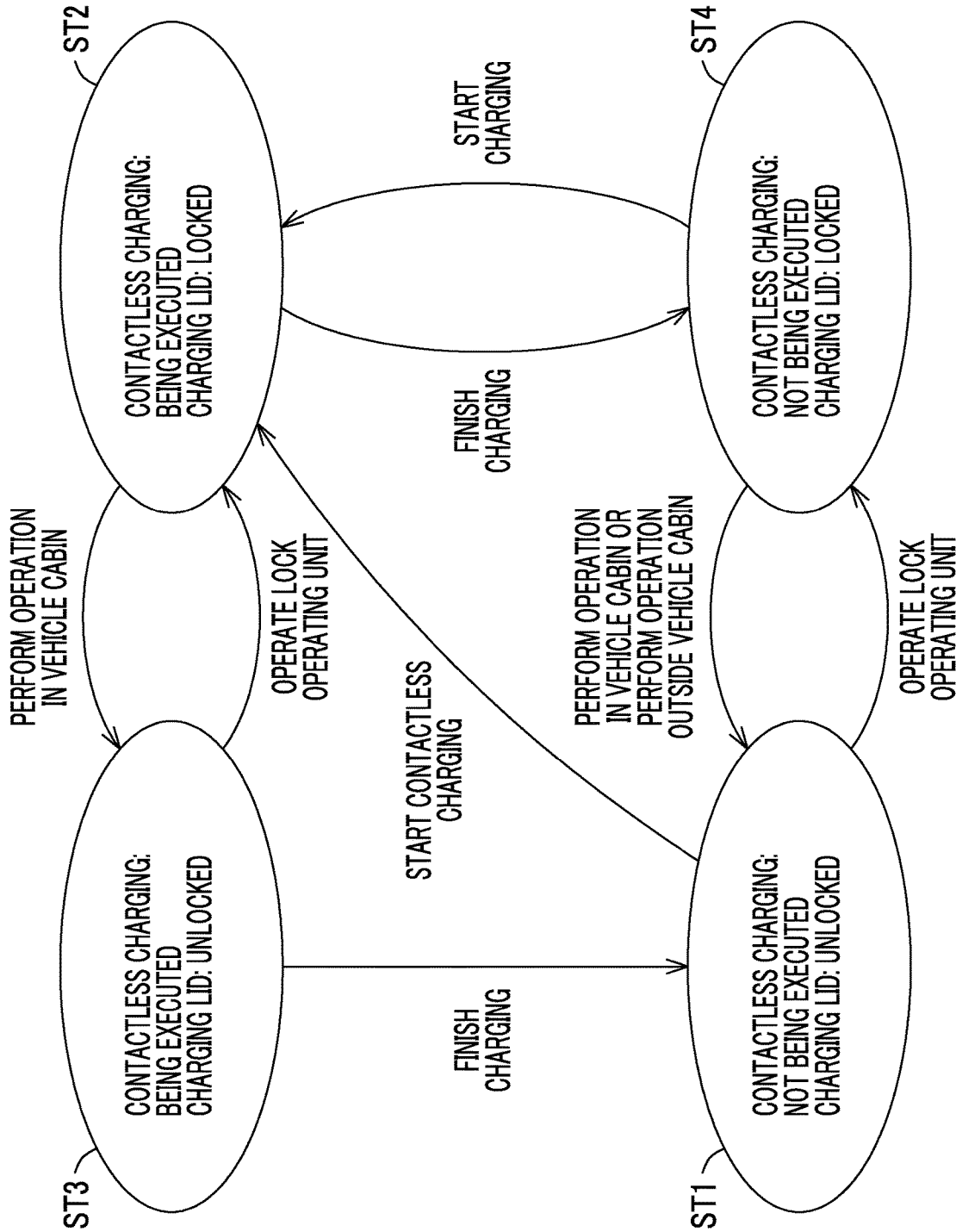
FIG. 3 is a state transition diagram illustrating transitions of a lock state of a charging lid according to a state of the contactless charging and an instruction from a user.

FIG. 3 is a state transition diagram illustrating transitions of the lock state of the charging lid 115 according to the state of contactless charging and an instruction from the user. With reference to FIG. 3, the vehicle 100 transitions among the following four states (states ST1, ST2, ST3, ST4) with respect to contactless charging and the lock state of the charging lid 115.

In the "state ST1", contactless charging is "not being executed", and the charging lid 115 is "unlocked". In the "state ST2", contactless charging is "being executed", and the charging lid 115 is "locked". In the "state ST3", contactless charging is "being executed", and the charging lid 115 is "unlocked". In the "state ST4", contactless charging is "not being executed", and the charging lid 115 is "locked".

In the state ST1, when contactless charging is started, the state transitions to ST2. That is, contactless charging is switched to "being executed", and the charging lid 115 is switched to "locked". As described above, in the vehicle 100 according to the present embodiment, the charging lid 115 is locked (kept in a closed state) when the electric power reception device 150 starts receiving electric power (contactless charging). Accordingly, the vehicle 100 can appropriately suppress accidental connection of the charging connector 310 to the charging inlet 110 during contactless charging.

In the state ST1, when an operation for locking the charging lid 115 is performed through the lock operating unit 170 or the lock operating unit 512, the state transitions to ST4. That is, contactless charging remains "not being executed", and the charging lid 115 is switched to "locked".

In the state ST2, for example, when contactless charging is finished due to complete charging of the electric power storage device 120, the state transitions to ST4. That is, the charging lid 115 remains "locked", and contactless charging is switched to "not being executed". In the state ST2, when an operation for unlocking the charging lid 115 is performed through the lock operating unit 170 in the vehicle cabin, the state transitions to ST3. That is, contactless charging remains "being executed", and the charging lid 115 is switched to "unlocked". As described above, in the vehicle 100 according to the present embodiment, even while the electric power reception device 150 is receiving electric power, the charging lid 115 is unlocked when the condition is satisfied. Accordingly, the vehicle 100 enables the user to connect the charging connector 310 to the charging inlet 110 when needed, even during contactless charging.

In the state ST2, even when an operation for unlocking the charging lid 115 is performed through the lock operating unit 512 of the smart key 500, the state does not transition to ST3. The reason is because the user outside the vehicle 100 may not recognize whether or not contactless charging is being performed. When the charging lid 115 is permitted to be unlocked from the outside of the vehicle 100 in such a case, the user has a possibility of connecting the charging connector 310 to the charging inlet 110 without noticing that contactless charging is being performed. Meanwhile, in the vehicle cabin, for example, the user has a high possibility of recognizing that contactless charging is being performed, from a monitor, not illustrated, that displays an indication that contactless charging is being performed. Thus, even during contactless charging, the charging lid 115 is permitted to be unlocked through the lock operating unit 170 in the vehicle cabin.

In the state ST3, for example, when contactless charging is finished due to connection of the charging connector 310 to the charging inlet 110, the state transitions to ST1. That is, the charging lid 115 remains "unlocked", and contactless charging is switched to "not being executed". In the state ST3, when an operation for locking the charging lid 115 is performed through the lock operating unit 170 or the lock operating unit 512, the state transitions to ST2. That is, contactless charging remains "being executed", and the charging lid 115 is switched to "locked".

In the state ST4, for example, when contactless charging is started by receiving an instruction to start contactless charging from the user, the state transitions to ST2. That is, the charging lid 115 remains "locked", and contactless charging is switched to "being executed". In the state ST4, when an instruction is provided to unlock the charging lid 115 by operating the lock operating unit 170 in the vehicle cabin or operating the lock operating unit 512 outside the vehicle cabin, the state transitions to ST1. That is, contactless charging remains "not being executed", and the charging lid 115 is switched to "unlocked".

As described above, in the vehicle 100 according to the present embodiment, conditions for unlocking the charging lid 115 are different according to whether or not contactless charging is being performed. Specifically, while contactless charging is not being executed (state ST4), when an instruction is provided to unlock the charging lid 115 by operating the lock operating unit 170 in the vehicle cabin or operating the lock operating unit 512 outside the vehicle cabin, the charging lid 115 is unlocked (a transition is made to the state ST1 from the state ST4). While contactless charging is being executed (state ST2), the charging lid 115 is not unlocked (a transition is not made to the state ST3 from the state ST2) even when an unlock operation is performed through the lock operating unit 512. In the vehicle 100, during contactless charging, the charging lid 115 is not unlocked from the outside of the vehicle by the user operating the lock operating unit 512. Thus, the vehicle 100 can reduce the possibility of accidental connection of the charging connector 310 to the charging inlet 110 during contactless charging.

Process Procedure of Changing Lock State of Charging Lid

Figure 4:
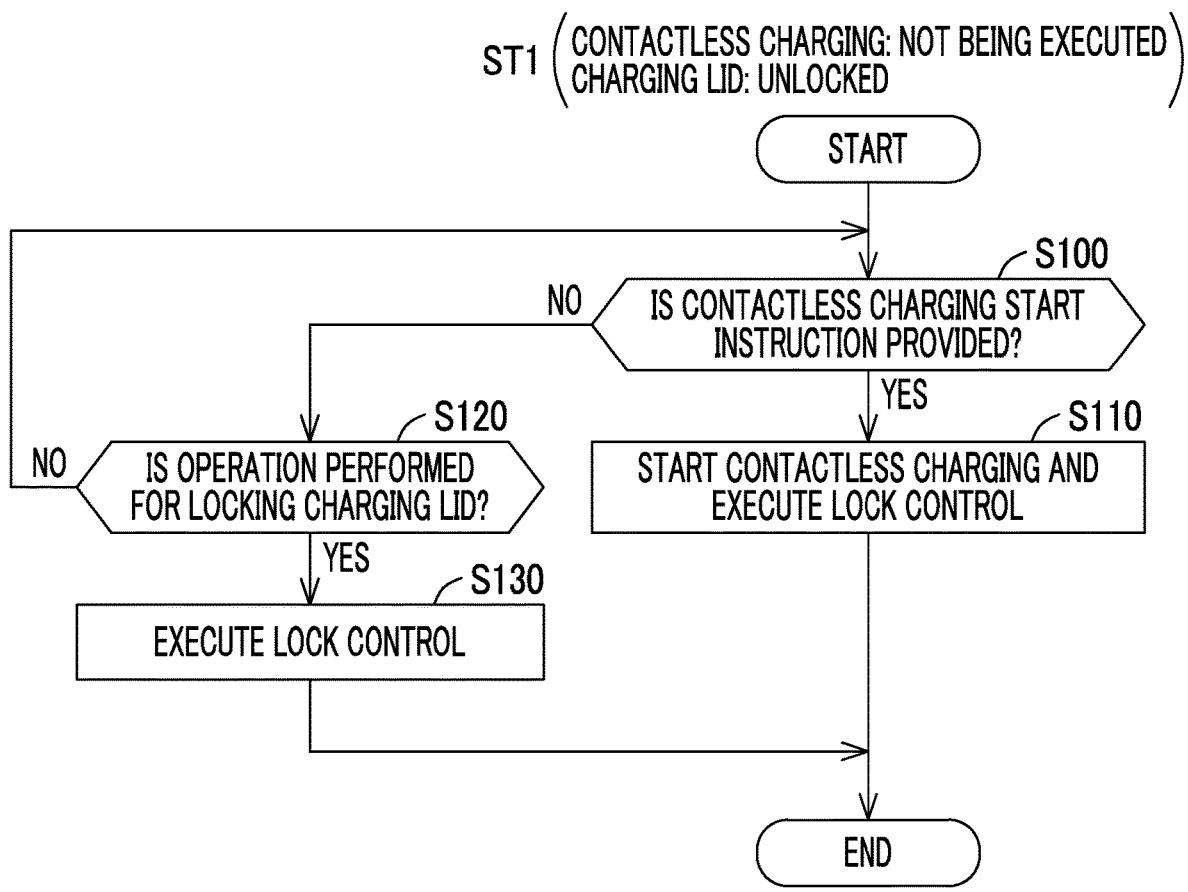
FIG. 4 is a flowchart illustrating a process procedure of changing the lock state of the charging lid in a state ST1.

FIG. 4 is a flowchart illustrating a process procedure of changing the lock state of the charging lid 115 in the state ST1 (FIG. 3). The process illustrated in the flowchart in FIG. 4 is executed when the vehicle 100 is in the state ST1 (while contactless charging is not being executed with the charging lid 115 unlocked).

With reference to FIG. 4, the ECU 190 determines whether or not an instruction to start contactless charging is provided (step S100). When the ECU 190 determines that an instruction to start contactless charging is provided (YES in step S100), the ECU 190 executes a process for starting contactless charging, and executes lock control by transmitting the lid lock signal to the lid lock mechanism 117 (step S110). Accordingly, the state transitions to ST2. As the process for starting contactless charging, for example, the ECU 190 controls the communication device 160 to transmit an instruction to start electric power transmission to the electric power transmission device 400.

When the ECU 190 determines that an instruction to start contactless charging is not provided (NO in step S100), the ECU 190 determines whether or not an operation for locking the charging lid 115 is performed through either the lock operating unit 170 or the lock operating unit 512 (step S120). When the ECU 190 determines that an operation for locking the charging lid 115 is not performed through the lock operating unit 170 or 512 (NO in step S120), the process transitions to step S100.

When the ECU 190 determines that an operation for locking the charging lid 115 is performed through the lock operating unit 170 or 512 (YES in step S120), the ECU 190 executes the lock control by transmitting the lid lock signal to the lid lock mechanism 117 (step S130). Accordingly, the state transitions to ST4.

Figure 5:
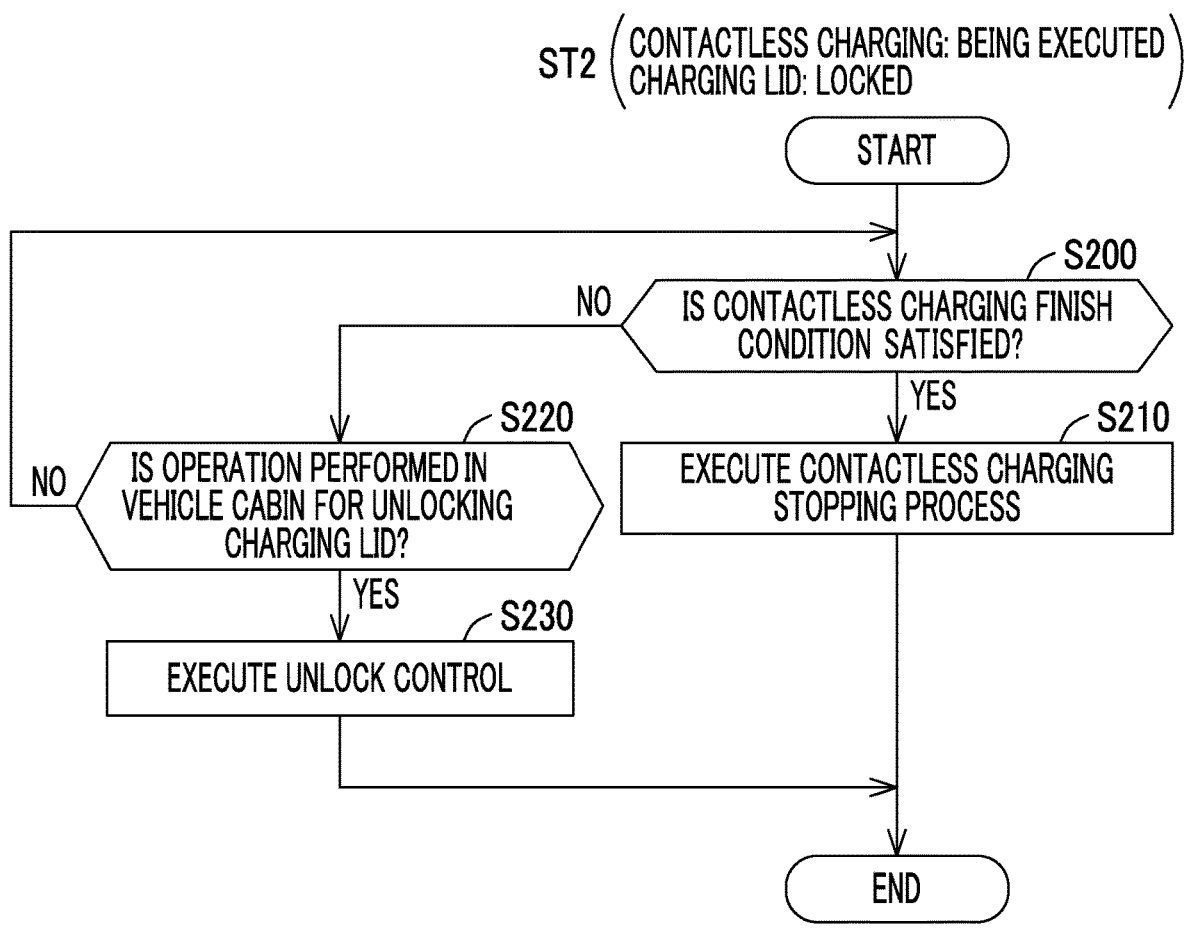
FIG. 5 is a flowchart illustrating a process procedure of changing the lock state of the charging lid in a state ST2.

FIG. 5 is a flowchart illustrating a process procedure of changing the lock state of the charging lid 115 in the state ST2. The process illustrated in the flowchart in FIG. 5 is executed when the vehicle 100 is in the state ST2 (while contactless charging is being executed with the charging lid 115 locked).

With reference to FIG. 5, the ECU 190 determines whether or not a condition such as complete charging of the electric power storage device 120 that finishes contactless charging is satisfied (step S200). When the ECU 190 determines that the condition that finishes contactless charging is satisfied (YES in step S200), the ECU 190 executes a process for stopping contactless charging (a process for stopping the electric power reception device 150 from receiving electric power) (step S210). Accordingly, the state transitions to ST4. As the process for stopping contactless charging, for example, the ECU 190 controls the communication device 160 to transmit an instruction to stop electric power transmission to the electric power transmission device 400.

When the ECU 190 determines that the condition that finishes contactless charging is not satisfied (NO in step S200), the ECU 190 determines whether or not an operation for unlocking the charging lid 115 is performed through the lock operating unit 170 in the vehicle cabin (step S220). When the ECU 190 determines that an operation for unlocking the charging lid 115 is not performed through the lock operating unit 170 (NO in step S220), the process transitions to step S200.

When the ECU 190 determines that an operation for unlocking the charging lid 115 is performed through the lock operating unit 170 (YES in step S220), the ECU 190 executes unlock control by transmitting the lid unlock signal to the lid lock mechanism 117 (step S230). Accordingly, the state transitions to ST3.

Figure 6:
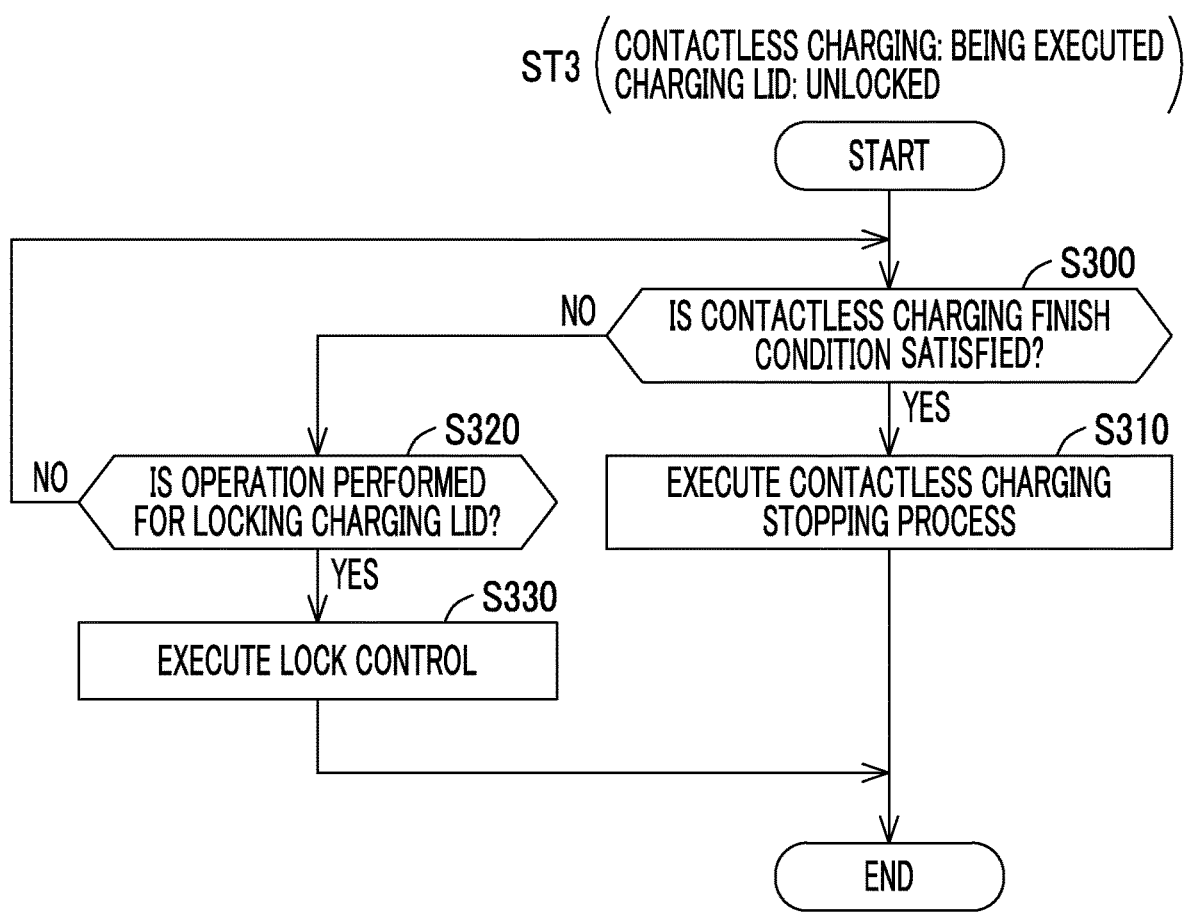
FIG. 6 is a flowchart illustrating a process procedure of changing the lock state of the charging lid in a state ST3.

FIG. 6 is a flowchart illustrating a process procedure of changing the lock state of the charging lid 115 in the state ST3. The process illustrated in the flowchart in FIG. 6 is executed when the vehicle 100 is in the state ST3 (while contactless charging is being executed with the charging lid 115 unlocked).

With reference to FIG. 6, the ECU 190 determines whether or not a condition such as connection of the charging connector 310 to the charging inlet 110 that finishes contactless charging is satisfied (step S300). When the ECU 190 determines that the condition that finishes contactless charging is satisfied (YES in step S300), the ECU 190 executes a process for stopping contactless charging (step S310). Accordingly, the state transitions to ST1.

When the ECU 190 determines that the condition that finishes contactless charging is not satisfied (NO in step S300), the ECU 190 determines whether or not an operation for locking the charging lid 115 is performed through the lock operating unit 170 or the lock operating unit 512 (step S320). When the ECU 190 determines that an operation for locking the charging lid 115 is not performed through the lock operating unit 170 or 512 (NO in step S320), the process transitions to step S300.

When the ECU 190 determines that an operation for locking the charging lid 115 is performed through the lock operating unit 170 or 512 (YES in step S320), the ECU 190 executes the lock control by transmitting the lid lock signal to the lid lock mechanism 117 (step S330). Accordingly, the state transitions to ST2.

FIG. 7 is a flowchart illustrating a process procedure of changing the lock state of the charging lid 115 in the state ST4. The process illustrated in the flowchart in FIG. 7 is executed when the vehicle 100 is in the state ST4 (while contactless charging is not being executed with the charging lid 115 locked).

With reference to FIG. 7, the ECU 190 determines whether or not an instruction to start contactless charging is provided (step S400). When the ECU 190 determines that an instruction to start contactless charging is provided (YES in step S400), the ECU 190 executes a process for starting contactless charging (step S410). Accordingly, the state transitions to ST2.

When the ECU 190 determines that an instruction to start contactless charging is not provided (NO in step S400), the ECU 190 determines whether or not an instruction to unlock the charging lid 115 is provided by either operating the lock operating unit 170 in the vehicle cabin or operating the lock operating unit 512 outside the vehicle cabin (step S420). When the ECU 190 determines that an operation for unlocking the charging lid 115 is not performed through the lock operating unit 170 or 512 (NO in step S420), the process transitions to step S400.

When the ECU 190 determines that an operation for unlocking the charging lid 115 is performed through the lock operating unit 170 or 512 (YES in step S420), the ECU 190 executes the unlock control by transmitting the lid unlock signal to the lid lock mechanism 117 (step S430). Accordingly, the state transitions to ST1.

As described heretofore, in the vehicle 100 according to the present embodiment, the ECU 190 controls the lid lock mechanism 117 to restrict connection of the charging connector 310 to the charging inlet 110 while the electric power reception device 150 is receiving electric power. The vehicle 100 restricts connection of the charging connector 310 to the charging inlet 110 during contactless charging (unless the user intentionally unlocks the charging lid 115). Accordingly, accidental connection of the charging connector 310 to the charging inlet 110 during contactless charging can be appropriately suppressed. Consequently, the vehicle 100 can appropriately suppress forced switching, not intended by the user, to contacted charging from contactless charging.

Other Embodiments

The embodiment describes the lid lock mechanism 117 as one example of a restriction mechanism for restricting connection of the charging connector 310 to the charging inlet 110. However, the restriction mechanism is not limited to the lid lock mechanism 117. For example, a connector lock mechanism may be used as the restriction mechanism. The connector lock mechanism is a mechanism with which the charging connector 310 is not detached from the charging inlet 110 when the charging connector 310 is connected to the charging inlet 110. In the connector lock mechanism, for example, the charging connector 310 is not detached from the charging inlet 110 by engaging a lock pin disposed in the charging inlet 110 with the charging connector 310 in a state in which the charging connector 310 is connected to the charging inlet 110. The charging connector 310 is detached from the charging inlet 110 by disengaging the lock pin disposed in the charging inlet 110 from the charging connector 310.

For example, during contactless charging, in a state in which the charging connector 310 is not connected to the charging inlet 110, the ECU 190 moves the lock pin disposed in the charging inlet 110 to a position in which the lock pin, if the charging connector 310 is connected to the charging inlet 110, engages with the charging connector 310. Then, the lock pin impedes insertion of the charging connector 310 into the charging inlet 110, and connection of the charging connector 310 to the charging inlet 110 is restricted. Accordingly, the connector lock mechanism functions as the restriction mechanism for restricting connection of the charging connector 310 to the charging inlet 110. One example of the connector lock mechanism is disclosed in Japanese Unexamined Patent Application Publication No. 2016-63695 (JP 2016-63695 A).

The embodiment describes an example in which the lock operating unit 512 of the smart key 500 is operated as a method of unlocking the charging lid 115 from the outside of the vehicle cabin while contactless charging is not being executed with the charging lid 115 locked. However, the method of unlocking the charging lid 115 from the outside of the vehicle cabin in such a case is not limited thereto. For example, the charging lid 115 may be unlocked by physically pressing the charging lid 115 from the outside in a state in which authentication between the vehicle 100 and the smart key 500 is successful. Alternatively, for example, the charging lid 115 may be unlocked by physically pressing the charging lid 115 from the outside in a state in which a door (not illustrated) of the vehicle 100 is unlocked.

The embodiment describes an example in which the lock operating unit 170 in the vehicle cabin is operated as a method of unlocking the charging lid 115 from the inside of the vehicle cabin while the charging lid 115 is locked. However, the method of unlocking the charging lid 115 from the inside of the vehicle cabin is not limited thereto. For example, the charging lid 115 may be unlocked when a switch for unlocking the door of the vehicle 100 is operated in the vehicle cabin.

In the embodiment, the charging lid 115 is locked when an operation for locking the charging lid 115 is performed through the lock operating unit 170 or 512 while the charging lid 115 is unlocked. However, the operation for locking the charging lid 115 while the charging lid 115 is unlocked is not limited thereto. For example, the charging lid 115 may be locked when a switch for locking the door of the vehicle 100 is operated in the vehicle cabin.

The embodiment describes an electric vehicle (EV) as the vehicle 100. However, the vehicle 100 does not need to be an electric vehicle and may be, for example, a plug-in hybrid vehicle (PHV) that can be charged from the outside.

The embodiment disclosed herein is for illustrative purposes from every point of view and should not be considered restrictive. The scope of the present disclosure is not disclosed by the description and is disclosed by the claims, and is intended to include all changes made in the equivalent meaning and scope of the claims.

What is claimed is:

1. A vehicle comprising:
an electric power reception device configured to contactlessly receive electric power from an electric power transmission device outside the vehicle;
a charging inlet configured such that a charging connector of a charging cable that supplies electric power to the vehicle is connected to the charging inlet;
a restriction mechanism configured to restrict connection of the charging connector to the charging inlet; and
a controller configured to execute a process of stopping electric power reception performed by the electric power reception device when the charging connector is connected to the charging inlet during the electric power reception performed by the electric power reception device, the controller controlling the restriction mechanism to restrict connection of the charging connector to the charging inlet during the electric power reception performed by the electric power reception device.

2. The vehicle according to claim 1, wherein the controller is configured to control the restriction mechanism to release the restriction of connection of the charging connector to the charging inlet even during the electric power reception performed by the electric power reception device, when a predetermined condition is satisfied.

3. The vehicle according to claim 2, wherein the predetermined condition is satisfied by operating a first operating unit disposed in a vehicle cabin when the electric power reception device is receiving electric power, and is satisfied by operating the first operating unit or operating a second operating unit outside the vehicle cabin when the electric power reception device is not receiving electric power.

4. The vehicle according to claim 3, wherein the restriction mechanism is configured with a charging lid that is opened or closed with respect to the charging inlet, and a lid lock mechanism configured to keep the charging lid in a closed state.

5. The vehicle according to claim 4, wherein:
   the first operating unit is a lock operating unit that is disposed in the vehicle cabin and changes a lock state of the charging lid; and
   the predetermined condition is that the lock operating unit is operated to release the charging lid.

6. The vehicle according to claim 4, further comprising a communication device configured to communicate with the outside of the vehicle, wherein:
   the predetermined condition is that the second operating unit is operated to release the charging lid;
   the communication device receives, from the second operating unit, a signal that changes a lock state of the charging lid; and
   the controller is configured to receive the signal through the communication device.

7. A method of controlling charging of a vehicle including an electric power reception device configured to contactlessly receive electric power from an electric power transmission device outside the vehicle, a charging inlet configured such that a charging connector of a charging cable that supplies electric power to the vehicle is connected to the charging inlet, a restriction mechanism configured to restrict connection of the charging connector to the charging inlet, and a controller configured to execute a process of executing and stopping contactless electric power reception performed by the electric power reception device, the method comprising:
   performing contacted charging from the charging connector when the charging connector is connected to the vehicle;
   performing contactless charging by the electric power reception device and restricting connection of the charging connector to the charging inlet when an instruction to start the contactless charging is provided with the charging connector not connected; and
   stopping the contactless electric power reception performed by the electric power reception device when the charging connector is connected to the charging inlet during electric power reception performed by the electric power reception device.

* * * * *

UNITED STATES PATENT AND TRADEMARK OFFICE
CERTIFICATE OF CORRECTION

PATENT NO. : 10,637,258 B2
APPLICATION NO. : 15/886226
DATED : April 28, 2020
INVENTOR(S) : Toru Ando Page 1 of 1

It is certified that error appears in the above-identified patent and that said Letters Patent is hereby corrected as shown below:

On the Title Page

Item (72), inventor city, delete "Obu" and insert --Obu-shi Aichi-ken--, therefor.

In the Specification

In Column 6, Line 22, after "performs", delete "is".

Signed and Sealed this
Ninth Day of June, 2020

Andrei Iancu
*Director of the United States Patent and Trademark Office*